(12) United States Patent
Xu et al.

(10) Patent No.: US 12,472,554 B2
(45) Date of Patent: Nov. 18, 2025

(54) SPHERICAL POWDER AND PREPARATION METHOD THEREFOR

(71) Applicant: SHENZHEN AEROSPACE SCIENCE ADVANCED MATERIALS CO., LTD, Guangdong (CN)

(72) Inventors: Hui Xu, Shenzhen (CN); Qing Yao, Shenzhen (CN)

(73) Assignee: SHENZHEN AEROSPACE SCIENCE ADVANCED MATERIALS CO., LTD, Guangdong (CN)

( * ) Notice: Subject to any disclaimer, the term of this patent is extended or adjusted under 35 U.S.C. 154(b) by 523 days.

(21) Appl. No.: 17/775,192

(22) PCT Filed: Dec. 19, 2019

(86) PCT No.: PCT/CN2019/126466
§ 371 (c)(1),
(2) Date: May 6, 2022

(87) PCT Pub. No.: WO2021/088217
PCT Pub. Date: May 14, 2021

(65) Prior Publication Data
US 2022/0395899 A1 Dec. 15, 2022

(30) Foreign Application Priority Data

Nov. 7, 2019 (CN) .......................... 201911082147.9
Nov. 7, 2019 (CN) ......................... 201911082177.X (51) Int. Cl.
*B22F 9/14* (2006.01)
*B22F 1/05* (2022.01)
*B22F 1/065* (2022.01)

(52) U.S. Cl.
CPC ............... *B22F 1/065* (2022.01); *B22F 1/05* (2022.01); *B22F 9/14* (2013.01); *B22F 2202/13* (2013.01);
(Continued)

(58) Field of Classification Search
CPC .................................. B22F 9/10; B22F 9/14
See application file for complete search history.

(56) References Cited

U.S. PATENT DOCUMENTS 3,021,562 A * 2/1962 Chisholm ................. B22F 9/14
  75/10.26
3,963,812 A * 6/1976 Schlienger ............... B22F 9/14
  425/8
(Continued)

FOREIGN PATENT DOCUMENTS

CA    2463462    4/2003
CN    1106325    8/1995
(Continued)

OTHER PUBLICATIONS

JPS627805A English language translation (Year: 1987).*
(Continued)

*Primary Examiner* — Sally A Merkling
*Assistant Examiner* — Sean P. O'Keefe
(74) *Attorney, Agent, or Firm* — HSML P.C.

(57) ABSTRACT

Disclosed is a spherical powder, and a preparation method therefor including: placing an electrode and a workpiece at two electrodes of a power supply, adjusting a discharging gap between the electrode and workpiece by a motion control system to generate an arc plasma, when arc plasma acts on surfaces of the electrode and workpiece, the surfaces of the electrode and workpiece are melt to form a melting region, at the same time, introducing a fluid medium into the discharging gap, controlling a flow rate of the fluid medium
(Continued)

and a relative rotation speed of the electrode or the workpiece, so as to change a working morphology of the arc plasma, such that a tiny explosion is generated in the melting region, crushing and throwing away a material located in the melting region, condensing the crushed molten material in the fluid medium and collecting a condensed fine spherical powder.

12 Claims, 6 Drawing Sheets

(52) U.S. Cl.
CPC ....... *B22F 2301/10* (2013.01); *B22F 2301/15* (2013.01); *B22F 2301/205* (2013.01); *B22F 2301/35* (2013.01); *B22F 2304/10* (2013.01); *B22F 2304/15* (2013.01)

(56) References Cited

U.S. PATENT DOCUMENTS

| | | | | |
|---|---|---|---|---|
| 4,488,031 | A | * | 12/1984 | Roberts ................. B22F 9/14 425/8 |
| 2005/0000950 | A1 | | 1/2005 | Schroder et al. |
| 2005/0034668 | A1 | | 2/2005 | Garvey et al. |
| 2016/0175929 | A1 | | 6/2016 | Colin et al. |

FOREIGN PATENT DOCUMENTS

| | | | | |
|---|---|---|---|---|
| CN | 2439921 | Y | | 7/2001 |
| CN | 103433499 | A | * | 12/2013 |
| CN | 103657359 | | | 3/2014 |
| CN | 103785846 | | | 5/2014 |
| CN | 103874538 | | | 6/2014 |
| CN | 104094377 | | | 10/2014 |
| CN | 104550991 | | | 4/2015 |
| CN | 105345019 | | | 2/2016 |
| CN | 105855560 | A | | 8/2016 |
| CN | 106670487 | | | 5/2017 |
| CN | 107116219 | A | | 9/2017 |
| CN | 107994213 | | | 5/2018 |
| CN | 108145170 | A | | 6/2018 |
| CN | 108705096 | | | 10/2018 |
| CN | 108907191 | A | * | 11/2018 ............ B22F 1/0088 |
| CN | 109226778 | | | 1/2019 |
| CN | 109332715 | | | 2/2019 |
| CN | 109465463 | | | 3/2019 |
| CN | 209139828 | U | | 7/2019 |
| CN | 110405220 | | | 11/2019 |
| DE | 2656330 | C2 | * | 3/1984 |
| JP | S627805 | A | | 1/1987 |
| JP | S6283407 | A | | 4/1987 |
| JP | S62227007 | | | 10/1987 |
| JP | S6462404 | | | 3/1989 |
| JP | H03173704 | | | 7/1991 |
| JP | H04280906 | | | 10/1992 |
| KR | 20180135760 | | | 12/2018 |
| WO | 0010756 | | | 3/2000 |

OTHER PUBLICATIONS

CN103785846A English language translation (Year: 2014).*
CN109226778A English language translation (Year: 2019).*
International Search Report issued for International Patent Application No. PCT/CN2019/126466, Date of mailing: Aug. 11, 2020, 7 pages including English translation.
Written Opinion issued for International Patent Application No. PCT/CN2019/126466, Date of mailing: Aug. 11, 2020, 7 pages including partial English machine translation.
Office Action issued for Chinese Patent Application No. 201911082147.9, dated Dec. 1, 2020, 5 pages.
Office Action issued for Chinese Patent Application No. 201911082147.9, dated May 31, 2021, 6 pages.
Office Action issued for Chinese Patent Application No. 201911082147.9, dated Jul. 28, 2021, 5 pages.
Office Action issued for Chinese Patent Application No. 201911082172.7, dated Dec. 1, 2020, 5 pages.
Office Action issued for Chinese Patent Application No. 201911082172.7, dated May 31, 2021, 6 pages.
Office Action issued for Chinese Patent Application No. 201911082177.X, dated Dec. 1, 2020, 6 pages.
Office Action issued for Chinese Patent Application No. 201911082177.X, dated May 31, 2021, 6 pages.
Office Action issued for Chinese Patent Application No. 201911082172.7, dated Jan. 20, 2023, 7 pages.
Office Action issued for Chinese Patent Application No. 201911082177.X, dated Jan. 20, 2023, 7 pages.
Chen, G., et al., "A comparative study of Ti—6AL—4V powders for additive manufacturing by gas atomization, plasma rotating electrode process and plasma atomization," Powder Technology 333 (2018) 38-46.
Extended European Search Report issued for European Patent Application No. 19951796.2, dated Nov. 17, 2023, 11 pages.
Notice of Reasons for Refusal issued for Japanese Patent Application No. 2022-526418, Dispatch Date: Jun. 13, 2023 10 pages including English machine translation.

* cited by examiner

SPHERICAL POWDER AND PREPARATION METHOD THEREFOR

TECHNICAL FIELD

The present disclosure relates to the field of preparation of metallic powders, in particular to a novel spherical powder and a preparation method thereof.

BACKGROUND

With the continuous development of industrial technology, novel materials and molding technologies are constantly being put forth new ideas and widely used in national defense and civilian core equipment that generally face complex and harsh working environments, which requires new materials to have very high strength and toughness, and very high resistance to creep, fatigue, oxidation and corrosion. Along with the high requirements on the performance of new materials, it also brings about the problem that the preparation of such materials becomes very difficult. At present, most products and parts of such materials are prepared by a near net shape forming technology, such as powder metallurgy, additive manufacturing (3D printing technology) and injection molding. metallic powder is one of the most important raw materials in these molding technologies, and the stability, degree of sphericity and purity of the metallic powder have a very important influence on the processing performance of new materials prepared by the above-mentioned molding technologies.

In the traditional process, the process of preparing spherical metallic powder mainly includes gas atomization process and rotating electrode process. Scholars at home and abroad have conducted a lot of research on the structure properties of workpieces printed with metallic powder prepared by the above-mentioned processes. Properties of parts fabricated with aerosolized powder and rotating electrode powder by 3D printing have been compared by some researchers. Under the same process conditions, the porosity of parts molded from nickel-base superalloy powder prepared by gas atomization method is 25 times higher than that of rotating electrode method, which is mainly due to the formation of micro-cracks and holes during the molding process of parts caused by factors such as the flowability of metallic powder and hollow powder. The comparison results of using 3D printing technology to prepare parts by Arash et al. show that the number of pores of parts molded from gas atomized powder is 3 times that of parts molded from rotating electrode powder under the same process; but the average grain size of parts molded from gas atomized powder is smaller. At present, the advantages of gas atomized powder used in additive manufacturing parts are that the process is mature and stable, the powder particle size is small, the structure is fine, and the element segregation is less, which is conducive to improving the mechanical properties of parts and reducing the cost of powder for the selective laser melting process; but factors such as hollow powder and satellite powder increase the risk of increased porosity and micro-cracks in the part; the advantages of rotating electrode powder used in additive manufacturing parts is that there are very few hollow powder and satellite spheres, and the part is molded densely and has a small surface roughness, which is beneficial to fracture and fatigue performance, but the cost of powder preparation is high, the particle size distribution is narrower, and the powder particle size is larger, thus is difficult to use in 3D printing technology.

SUMMARY

Accordingly, the present disclosure provides a method for preparing a novel spherical powder, the metallic powder prepared from which has a small particle size, a regular particle shape, a good degree of sphericity, and a low content of hollow powder and satellite powder.

The specific technical solutions are as follows:

A method for preparing a novel spherical powder, including the following steps:

placing an electrode and a workpiece at two electrodes of a power supply, adjusting a discharging gap between the electrode and the workpiece by a motion control system to generate an arc plasma, when the arc plasma acts on surfaces of the electrode and the workpiece, the surfaces of the electrode and the workpiece are melted, to form a melting region, at the same time, introducing a fluid medium into the discharging gap, controlling a flow rate of the fluid medium and a relative rotation speed of the electrode or the workpiece, so as to change a working morphology of the arc plasma, such that a tiny explosion is generated in the melting region, crushing and throwing away a material located in the melting region, condensing the crushed molten material in the fluid medium, and collecting a condensed fine spherical powder;

wherein the electrode and/or the workpiece is provided with a hollow cavity.

Compared with the current technology, the present disclosure has the following beneficial effects:

In the preparation method of the novel spherical powder of the present disclosure, the electrode and the workpiece are respectively placed at the two electrodes of the power supply, and the arc plasma is used as a high-density energy heat source to act on the surfaces of the electrode and the workpiece, so that the surfaces of the electrode and the workpiece are melted, to form a tiny melting craters, that is, a melting region. At the same time, a fluid medium is introduced between the electrode and the workpiece, and through the relative displacement between the electrode and the workpiece and the arc-moving coupling effect of the fluid medium, the material in the melting region is continuously thrown from the melting crater, which increases the discharge rate of particles and increases the production efficiency. In the meantime, controlling the rotation speed of the electrode or the workpiece and the flow rate of the fluid medium is able to change the working state of the arc plasma, create a tiny explosion in the melting region, crush and throw away the material located in the melting region, further refine the material, then, the material in the melting region that is crushed and thrown away is rapidly cooled in the fluid medium, and the fine particles are solidified into spherical powder due to the shrinkage of surface tension during the condensation process, and then the cooled fine spherical powder is collected. Wherein, the crushed fine particles are rapidly condensed in the fluid medium, and the obtained fine spherical powder has a good degree of sphericity. Through the above method, many current problems are solved, such as there are many hollow spheres and satellite powders in the preparation of powder by atomization technology, low efficiency in the preparation of powder by rotating electrode technology, and large powder particle size, and the obtained spherical powder has a small and uniform particle size, regular particle shape, good degree of sphericity, and low content of hollow powder and satellite powder.

Furthermore, the fine spherical powder may also be cleaned, dried and sieved, and the spherical powder with a particle size of 10 μm to 250 μm is collected, giving the powder better flowability. The motion control system is controlled to adjust the relative position of the electrode and the workpiece within 0.1 mm to 100 mm, the rotation speed of the electrode or workpiece is controlled within the range of 100 r/min to 60,000 r/min, and the flow rate of the fluid medium during initial introduction is controlled within the range of 0.5 L/min to 500 L/min, which is beneficial to improve the yield of fine powder and collect more spherical powders with particle size of 10 μm to 250 μm.

Moreover, a horn-shaped buffer portion and a stepped multi-stage powder collecting device are used to collect the fine spherical powder in the fluid medium. As the fluid medium flows through the buffer portion and each step, the fine spherical powder in the fluid medium may also be deposited to avoid the loss or splash of the fine spherical powder with the fluid medium, and further achieve the purpose of improving the yield of fine powder.

DETAILED DESCRIPTION OF THE EMBODIMENTS

The present disclosure will be further described in detail below with reference to specific examples. The present disclosure may be embodied in many different forms and is not limited to the embodiments described herein. Rather, these embodiments are provided so that the understanding of the disclosure of the present invention will be more thorough and complete.

Unless otherwise defined, all technical and scientific terms used herein have the same meaning as commonly understood by skilled person in the art to which the present disclosure belongs. The terms used in the specification of the present disclosure herein are for the purpose of describing specific embodiments only and are not intended to limit the present disclosure. The term "and/or" used herein includes any and all combinations of one or more of the associated listed items.

A method for preparing a novel spherical powder includes the following steps:

placing an electrode and a workpiece at two electrodes of a power supply, adjusting a discharging gap between the electrode and the workpiece by a motion control system to generate an arc plasma, when the arc plasma acts on surfaces of the electrode and the workpiece, the surfaces of the electrode and the workpiece are melted, to form a melting region, at the same time, introducing a fluid medium into the discharging gap, controlling a flow rate of the fluid medium and a relative rotation speed of the electrode or the workpiece, so as to change a working morphology of the arc plasma, such that a tiny explosion is generated in the melting region, crushing and throwing away a material located in the melting region, condensing the crushed molten material in the fluid medium, and collecting a condensed fine spherical powder;

wherein the electrode and/or the workpiece is provided with a hollow cavity.

Placing the electrode and the workpiece at two electrodes of the power supply may be understood as connecting the electrode to an anode of the power supply and connecting the workpiece to a cathode of the power supply. It can also be understood that the electrode is connected to the cathode of the power supply, and the workpiece is connected to the anode of the power supply. This method breaks through the limitation that the workpiece can only be connected to the cathode of the power supply in the existing technology, and there is no special limitation on the appearance of the workpiece. Meanwhile, by changing the polarity of the electrode and the workpiece, it can also improve the efficiency in the preparation of spherical powder and the yield of fine powder.

When the electrode is connected to the anode of the power supply, the power supply drives the electrode to rotate, and at this time, the electrode is provided with a hollow cavity. It can be understood that the electrode provided with the hollow cavity is an electrode provided with a single tube, multiple tubes or a hollow nesting.

Figure 1:
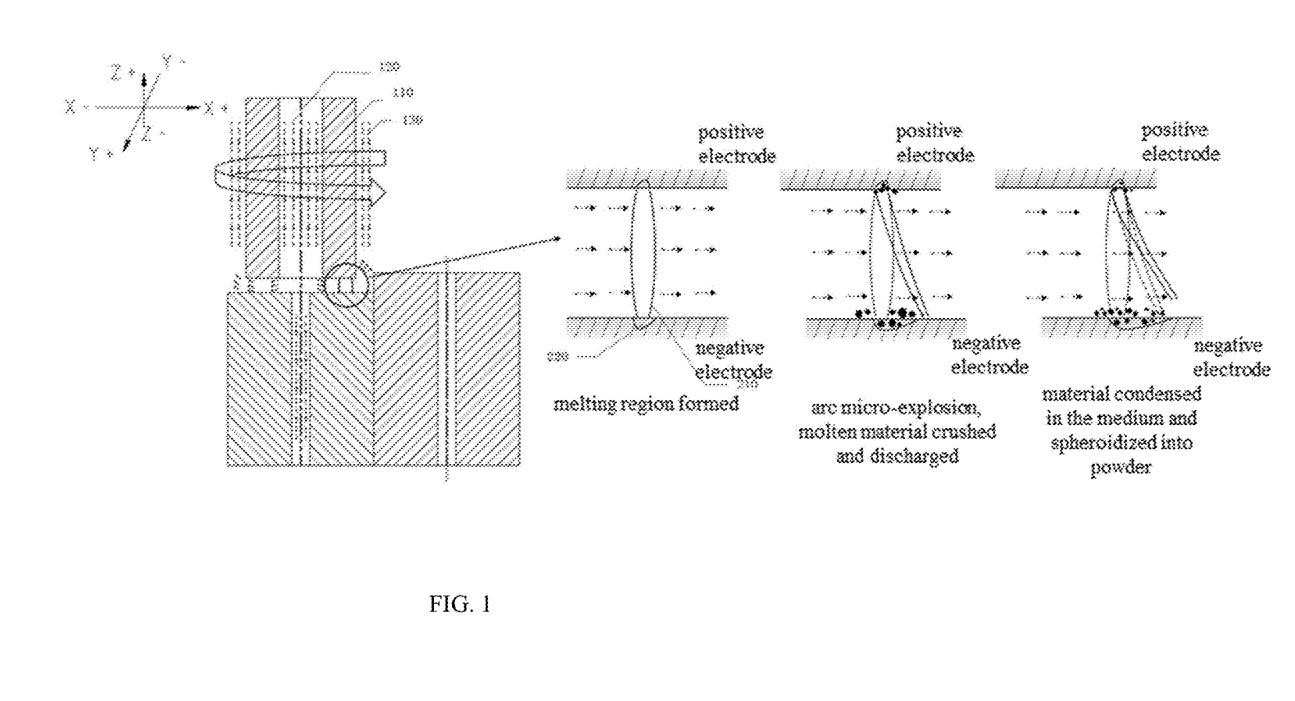
FIG. 1 is a schematic diagram of the principle of producing powder by arc micro-explosion technology.

In some preferred embodiments, the electrode is an electrode provided with a single tube, whose partial structure is shown in a left side of FIG. 1. The single tube electrode is provided with an electrode assembly 110 and a channel tube 120 located between electrode assemblies. The channel tube is provided with an inlet and an outlet, and the fluid medium may enter from the inlet of the channel tube and flow out from the outlet of the channel tube. The outlet of the channel tube faces the workpiece, which allows the fluid medium to flow to the workpiece. In addition, the fluid medium may also enter from the outside 130 of the channel tube, and flow along the outer surface of the electrode assembly to the workpiece.

It can be understood that the fluid medium may be introduced separately from the inside or outside the hollow cavity of the electrode, or may be introduced from the inside and outside the hollow cavity of the electrode simultaneously. The fluid mediums introduced from inside and outside the hollow cavity may be the same fluid medium or different fluid medium. The fluid mediums introduced from inside and outside the hollow cavity are each independently selected from a water-based medium and/or inert gas, and the inert gas includes nitrogen.

The water-based medium is preferably distilled water.

When the workpiece is connected to the anode of the power supply, the power supply drives the workpiece to rotate. At this time, the workpiece is provided with the hollow cavity. The fluid medium may be introduced separately from the inside or outside the hollow cavity of the workpiece, or may be introduced from the inside and outside the hollow cavity of the workpiece simultaneously. The introduction of the fluid medium from outside the hollow cavity of the workpiece may be understood as: the fluid medium flows to the electrode along the outer surface of the workpiece. The fluid mediums introduced from inside and outside the hollow cavity may be the same fluid medium or different fluid medium. The fluid mediums introduced from inside and outside the hollow cavity are each independently selected from a water-based medium and/or inert gas, and the inert gas includes nitrogen.

The water-based medium is preferably distilled water.

The power supply is a direct current pulse power supply, a direct current constant current power supply, an alternating current pulse power supply or an alternating current constant current power supply.

Preferably, the power supply is a pulse power supply with a pulse width of 2 µs to 200,000 µs, and a pulse interval of 2 µs to 200,000 µs.

The relative position of the electrode and the workpiece is adjusted by the motion control system to obtain an arc plasma in an ideal discharge state.

It can be understood that the arc plasma is generated by adjusting the discharge gap between the electrode and the workpiece. Preferably, the discharge gap, that is, the distance between a discharging end of the electrode and a surface of the workpiece, is from 0.1 mm to 100 mm. This distance enables the arc plasma to act on the electrode and the workpiece, and can ensure that the fluid medium has a great pressure when passing through. A central temperature of the arc plasma is up to 10,000 K, which can melt most of the conductive materials. The surface of the workpiece is melted under the action of the arc plasma, thus forming a tiny melting crater with a radius of 0.5 mm to 2 mm, that is, the melting region. At this time, the electrode rotates mechanically at a high speed relative to the workpiece.

Preferably, the power supply parameters of the power supply further include: the gap voltage of 10 V to 160 V, and the discharge current of 5 A to 1,000 A.

Preferably, the electrode is a copper electrode or graphite electrode.

While turning on the power supply, the fluid medium is introduced between the electrode and the workpiece. FIG. 1 shows a preferred embodiment of the introduction of the fluid medium, and the arrow in FIG. 1 indicates the flow direction of the fluid medium. The right side of FIG. 1 is an enlarged view of the discharge gap, 210 indicates the arc plasma, and 220 indicates the melting crater. Through the relative displacement between the electrode and the workpiece and the arc-moving coupling effect of the fluid medium, the material in the melting region is continuously thrown away from the melting crater, which increases the discharge rate of particles and increases the processing efficiency. Meanwhile, by controlling the rotation speed of the electrode or the workpiece and the flow rate of the fluid medium, the working state of the arc plasma can be changed, which generates a tiny explosion in the melting region, crushes the material located in the melting region, and further refines the material.

It can be understood that powders with different particle size distributions may be obtained by controlling the motion control system, a parameter of the power supply, the rotation speed and the flow rate.

When the electrode is connected to the anode of the power supply, preferably, the rotation speed of the electrode is 100 r/min to 60,000 r/min, more preferably 3000 r/min to 60,000 r/min. Similarly, when the workpiece is connected to the anode of the power supply, preferably, the rotation speed of the workpiece is 100 r/min to 60,000 r/min, more preferably 3,000 r/min to 60,000 r/min.

Preferably, the flow rate of the fluid medium during initial introduction is from 0.5 L/min to 500 L/min.

By controlling the rotation speed of the electrode or metallic workpiece within the above range, and controlling the flow rate of the fluid medium during initial introduction within the above range, it is beneficial to improve the yield of fine powder and collect more metallic powders with particle size of 10 µm to 250 µm.

It can be understood that the electrode and the workpiece are both conductor materials or weakly conductive materials, and the material of the electrode and the material of the workpiece may be the same or different.

Since the central temperature of arc plasma is up to 10000K, most conductive materials are melted, therefore the above method can be applied to the preparation of various conductive powders.

Moreover, the above method does not impose too many requirements on the shape of the workpiece, and the workpiece may be in a regular or irregular shape, such as a rod shape or a block shape.

The crushed material after the tiny explosion is rapidly cooled in the fluid medium, and the crushed fine particles are solidified into fine spherical powder due to the shrinkage of surface tension during the condensation process, and the condensed fine spherical powder is collected.

Specifically, the device for collecting the above-mentioned fine spherical powder in the fluid medium is a multi-stage powder collecting device. The multi-stage powder collecting device is provided with a horn-shaped buffer portion and a step-shaped collection platform smoothly connected to the horn-shaped buffer portion. Each step corresponds to one collection platform. The condensed fine spherical powder flows out of the multi-stage powder collecting device with the fluid medium, and then, as the fluid medium flows through each step, the fine spherical powder may be deposited on the steps, so as to avoid the direct flushing by the fluid medium to the powder collecting box, which causes the fine spherical powder to be lost or splashed with the fluid medium, to ensure the integrity of the powder collection and achieve the purpose of improving the yield of fine powder.

The condensed fine spherical powder may also be cleaned, dried and sieved. The cleaning agent may be selected from carbonated cleaning agent, alcohol cleaning agent or ether cleaning agent, which can remove the oil stains in the powder. The carbonated cleaning agent, the alcohol cleaning agent or the ether cleaning agent has a low melting point, which is volatile, and is convenient for subsequent drying.

The cleaned powder is dried in a vacuum drying box or resistance box. After drying, the powder is sieved in a grading sieve to collect particles with a particle size of 10 µm to 250 µm. Preferably, particles with a particle size between 10 µm and 103 µm are collected.

The crushed fine particles are rapidly condensed in the fluid medium, and the obtained primary spherical powder has a good degree of sphericity, giving the powder better flowability.

The novel spherical powder prepared by the above-mentioned method has a smaller particle size, high fine powder yield, regular particle shape, good degree of sphericity, low content of the hollow powder and satellite powder, and good flowability.

The present disclosure will be further described below with reference to specific examples.

Example 1

This example provided a method for preparing a novel spherical powder, including the following steps:

A block of 304 stainless steel was used as the workpiece with a size of 100 mm*100 mm*20 mm. After cleaning and decontamination, it was connected to the cathode of the power supply. A graphite electrode provided with a single tube was connected to the positive electrode of the power supply. The distance between the workpiece and the discharge end of the electrode was 0.5 mm. The multiple tubes refer to a plurality of channel tubes located between the electrode assemblies, and the outlet of the channel tubes faced the block of 304 stainless steel.

The power supply parameters were set as follows: the gap voltage was 45 V to 55 V, the discharge current was 500 A, the pulse width was 2,000 μs, the pulse interval was 200 μs, the power supply was turned on, and the rotation speed of the electrodes was controlled to 5000 r/min. At the same time, distilled water was introduced into the plurality of the channel tubes, with a flow rate of 50 L/min when introduced. Under the above-mentioned process conditions, the arc plasma acted on the surfaces of the graphite electrode and the workpiece, the molten material was continuously discharged with distilled water, exploded and crushed, and finally condensed into fine spherical powder in distilled water, that is, novel spherical powder.

After 0.1 h of processing, the metallic workpiece was weighed to learn that it lost 290 g, that is, the processing efficiency of the above method reached 2900 g/h. The obtained novel spherical powder was shown in FIG. 2.

Example 2

This example provided a method for preparing a novel spherical powder, including the following steps:

A rod-shaped TC4 (titanium alloy) was used as the workpiece for processing, with an outer diameter of φ 20 mm, an inner diameter of φ 10 mm, and a length of 100 mm. After cleaning and decontamination, it was connected to the anode of the power supply. The TC4 electrode was connected to the cathode of the power supply, the distance between the discharge end of the electrode and the workpiece was 1 mm, the rod-shaped TC4 was provided with one channel tube, and the outlet of the channel tube faced the TC4 electrode.

The power supply parameters were set as follows: the gap voltage was 45 V to 55 V, the discharge current was 500 A, the pulse width was 2,000 μs, the pulse interval was 200 μs, the power supply was turned on, and the rotation speed of the tube-rotating electrode was controlled to 3000 r/min. At the same time, distilled water was introduced inside the channel tube and outside the channel tube, with a flow rate of 50 L/min when introduced. Under the above-mentioned process conditions, the arc plasma acted on the surfaces of the electrode and the workpiece, the molten material was continuously discharged with distilled water, exploded and crushed, and finally condensed into fine spherical powder in distilled water, that is, novel spherical powder.

After 0.5 h of processing, the metallic workpiece was weighed to lose 850 g, that is, the processing efficiency of the above method reached 1700 g/h. The obtained novel spherical powder was shown in FIG. 3.

Figure 2:
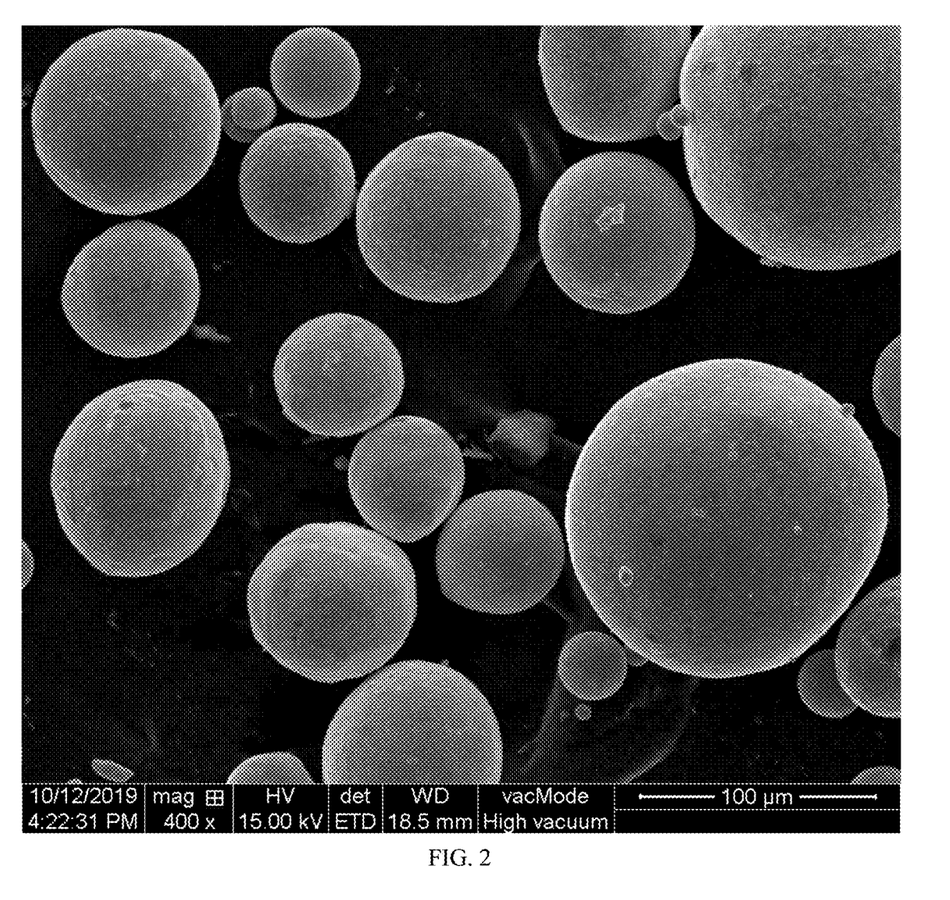
FIG. 2 is a schematic diagram of spherical metallic powder of Example 1.
Figure 3:
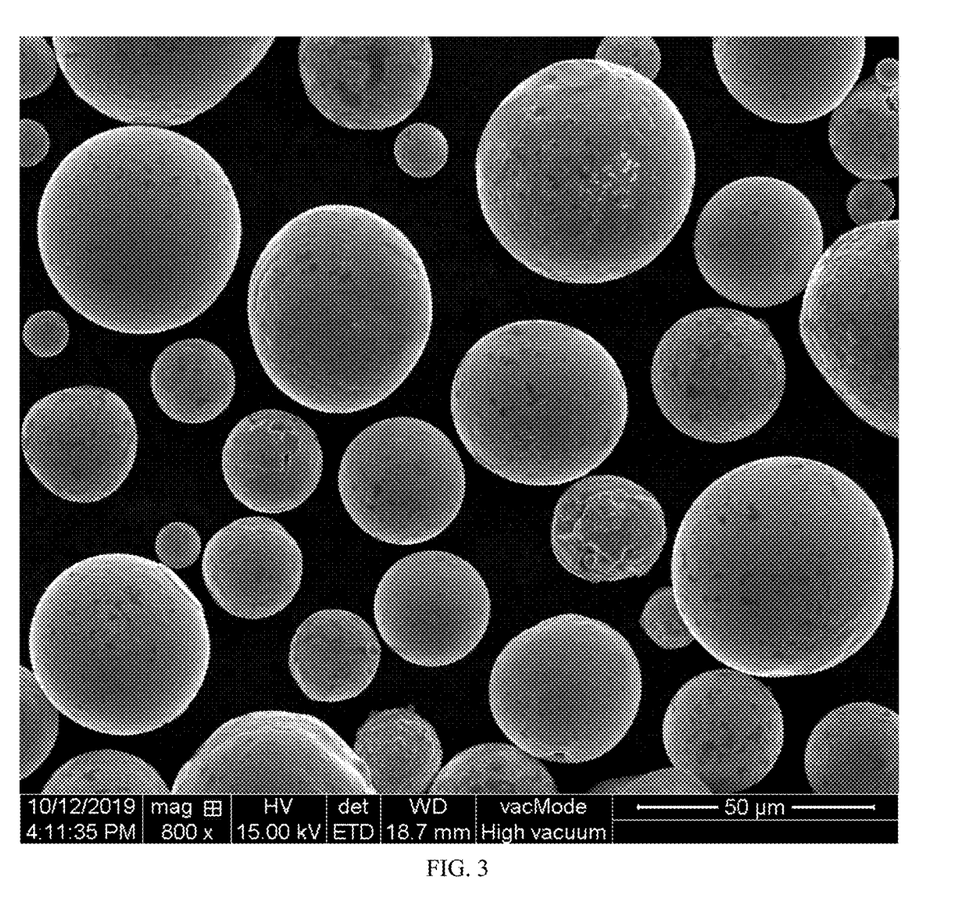
FIG. 3 is a schematic diagram of spherical metallic powder of Example 2.

It can be seen from FIG. 2 and FIG. 3 that, the spherical powder prepared by the method in Example 1 and Example 2, has a smaller particle size, regular particle shape, good degree of sphericity, and low content of hollow powder and satellite powder.

Example 3

This example provided a method for preparing a a novel spherical powder, including the following steps:

A block of nickel alloy was used as the metallic workpiece with a size of 100 mm*100 mm*20 mm. After cleaning and decontamination, it was connected to the cathode of the power supply. A tube graphite electrode was connected to the positive electrode of the power supply. The distance between the workpiece and the discharge end of the electrode was 0.5 mm. The multiple tubes refer to a plurality of channel tubes located between the electrode assemblies, and the outlet of the channel tubes faced the block nickel alloy.

The power supply parameters were set as follows: the gap voltage was 45 V to 55 V, the discharge current was 500 A, the pulse width was 2,000 μs, the pulse interval was 200 μs, the power supply was turned on, and the rotation speed of the electrodes was controlled to 3000 r/min. At the same time, distilled water was introduced into a plurality of the channel tubes, with a flow rate of 20 L/min when introduced. Under the above-mentioned process conditions, the arc plasma acted on the surfaces of the graphite electrode and the nickel alloy workpiece, the molten material was continuously discharged with distilled water, exploded and crushed, and finally condensed into fine spherical powder in distilled water, which was followed by distilled water into a step-shaped multi-stage powder collecting device.

Figure 4:
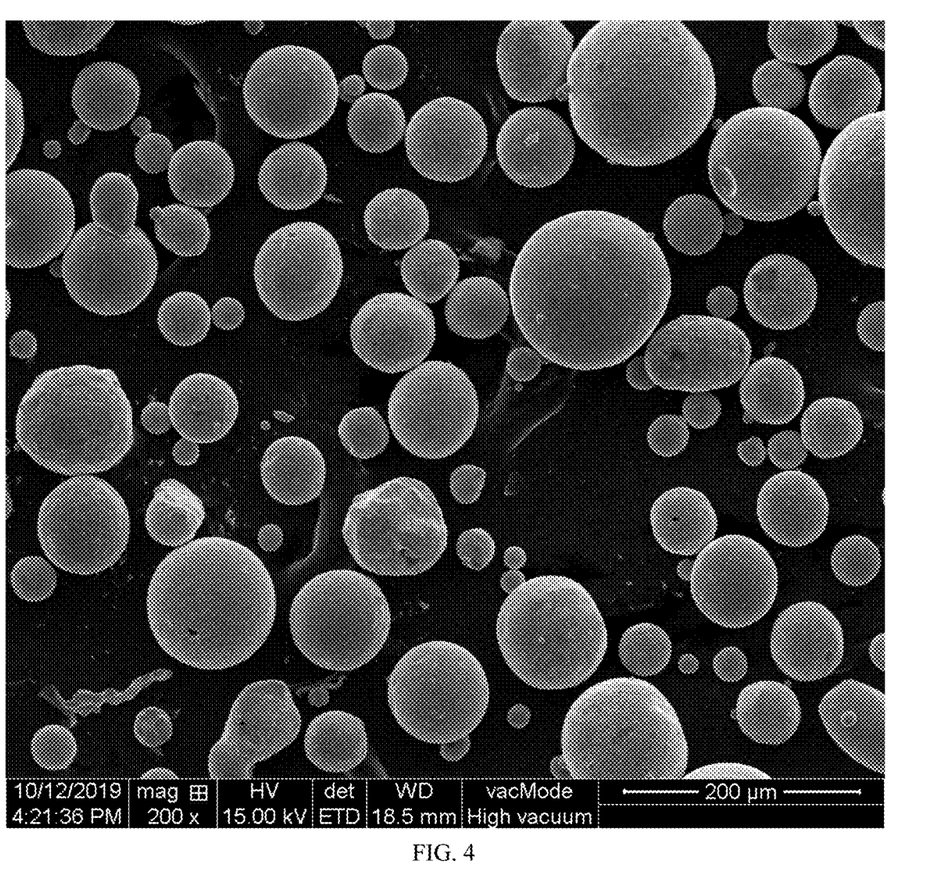
FIG. 4 is a schematic diagram of spherical metallic powder of Example 3.

The fine spherical powder was cleaned with carbonated cleaning agent, dried, then sieved, and particles with a particle size of 10 μm to 250 μm were collected, which is the novel spherical powder, as shown in FIG. 4.

After 1 h of processing, the obtained spherical powder with particle size of 10 μm to 2 50 μm was weighed, and the proportion of the collected powder weight to the total mass of the workpiece weight loss was calculated, that is, the yield of fine powder, reached 88.3%.

Example 4

This example provided a method for preparing a a novel spherical powder, including the following steps:

A rod-shaped copper alloy was used as the metallic workpiece, with an outer diameter of φ 20 mm, an inner diameter of φ 9 mm, and a length of 100 mm. After cleaning and decontamination, it was connected to the anode of the power supply. The copper electrode was connected to the cathode of the power supply, the distance between the discharge end of the electrode and the workpiece was 1 mm, the rod-shaped copper alloy was provided with one channel tube, and the outlet of the channel tube faced the copper electrode.

The power supply parameters were set as follows: the gap voltage was 45 V to 55 V, the discharge current was 500 A, the pulse width was 2,000 μs, the pulse interval was 200 μs, the power supply was turned on, and the rotation speed of the electrodes was controlled to 3000 r/min. At the same time, distilled water was introduced inside the channel tube and outside the channel tube, with a flow rate of 20 L/min when introduced. Under the above-mentioned process conditions, the arc plasma acted on the surfaces of the copper electrode and the copper alloy workpiece, the molten material was continuously discharged with distilled water, exploded and crushed, and finally condensed into fine spherical powder in distilled water, which was followed by distilled water into a step-shaped multi-stage powder collecting device.

Figure 5:
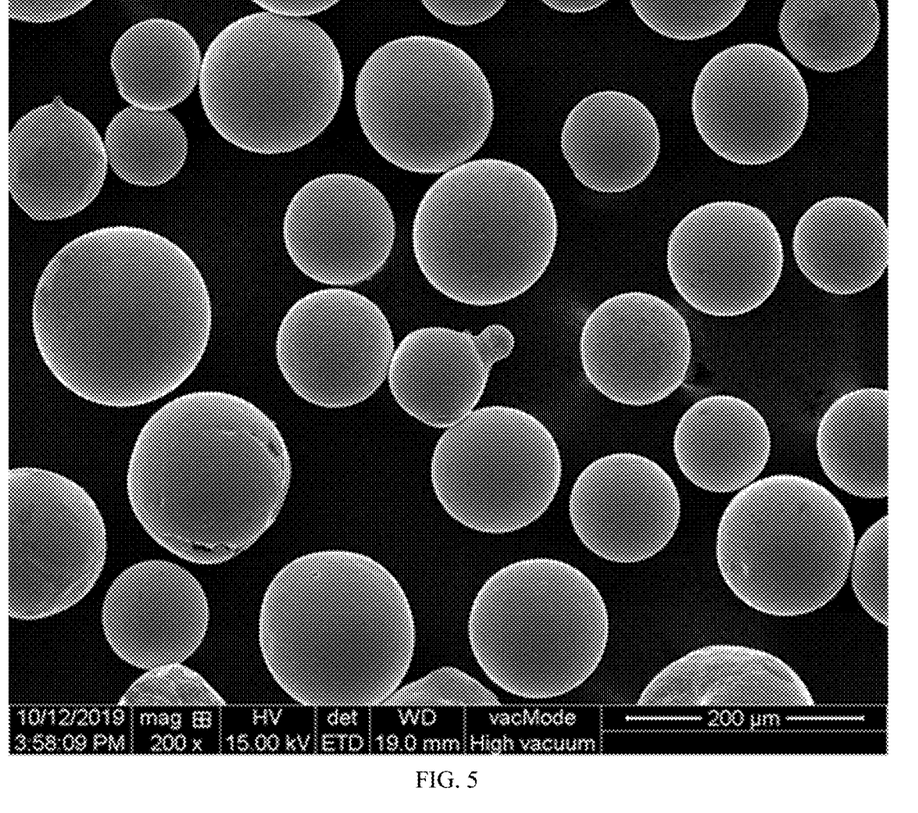
FIG. 5 is a schematic diagram of spherical metallic powder of Example 4.

The fine spherical powder was cleaned with carbonated cleaning agent, dried, then sieved, and particles with a particle size of 10 µm to 250 µm were collected, which is the novel spherical powder, as shown in FIG. 5.

After 0.5 h of processing, the obtained spherical powder with particle size of 10 µm to 250 µm was weighed, and the proportion of the collected powder weight to the total mass of the workpiece weight loss was calculated, that is, the yield of fine powder, reached 86.1%.

Example 5

This example provided a preparation method of a novel spherical powder, which was basically the same as the preparation method of Example 1, except that the rotation speed of the electrode and the flow rate of distilled water were different. Specifically comprising the following steps:

A block nickel alloy was used as the metallic workpiece with a size of 100 mm*100 mm*20 mm. After cleaning and decontamination, it was connected to the cathode of the power supply. A tube graphite was connected to the positive electrode of the power supply. The distance between the workpiece and the discharge end of the electrode was 0.5 mm. The multiple tubes refer to a plurality of channel tubes located between the electrode assemblies, and the outlet of the channel tubes faced the block nickel alloy.

The power supply parameters were set as follows: the gap voltage was 45 V to 55 V, the discharge current was 500 A, the pulse width was 2,000 µs, the pulse interval was 200 µs, the power supply was turned on, and the rotation speed of the electrodes was controlled to 1000 r/min. At the same time, distilled water was introduced into a plurality of the channel tubes, with a flow rate of 20 L/min when introduced. Under the above-mentioned process conditions, the arc plasma acted on the surfaces of the graphite electrode and the nickel alloy workpiece, the molten material was continuously discharged with distilled water, exploded and crushed, and finally condensed into fine spherical powder in distilled water, which was followed by distilled water into a step-shaped multi-stage powder collecting device.

Figure 6:
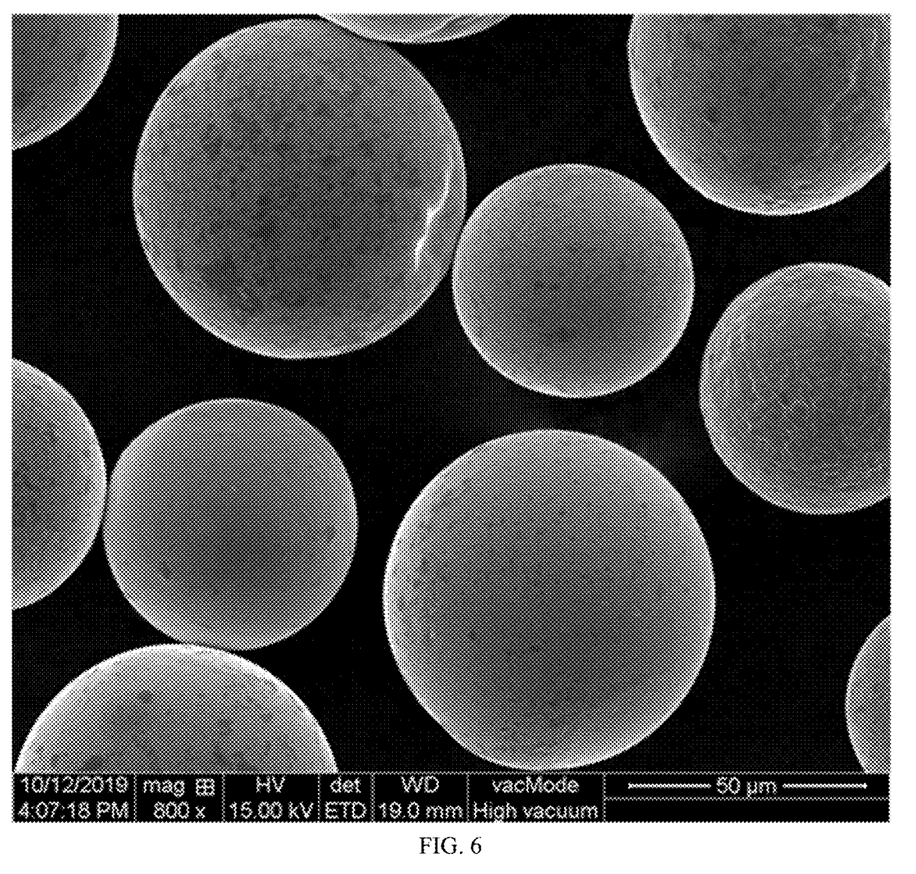
FIG. 6 is a schematic diagram of spherical metallic powder of Example 5.

The fine spherical powder was cleaned with carbonated cleaning agent, dried, then sieved, and particles with a particle size of 10 µm to 250 µm were collected, which is the novel spherical powder, as shown in FIG. 6.

After 1 h of processing, the obtained spherical powder with particle size of 10 µm to 2 50 µm was weighed, and the proportion of the collected powder weight to the total mass of the workpiece weight loss was calculated, that is, the yield of fine powder, reached 79.6%.

The flowability of the spherical powders of Examples 3 to 5 was measured, and the measurement method and results were as follows:

According to GB/T 1482-2010/ISO 4490:2001 metallic powders-determination of flow time by means of a calibrated funnel (Hall flowmeter), powder flow time, that is, the time required to measure 50 g of powder flowing through a calibrated-sized funnel hole, and the arithmetic mean of three measurements was taken.

Measurement procedure: the outlet of the funnel was blocked with a finger, and a sample was put into the funnel. It should be ensured that the bottom of the funnel was filled with powder, the stopwatch was started when the hole of the funnel was opened and the stopwatch was stopped when all the powder in the funnel had been drained. Time was record with an accuracy of 0.1 s.

The powder flowability of Example 3 was 21.57 s; the powder flowability of Example 4 was 22.88 s; and the powder flowability of Example 5 was 25.34 s.

As can be seen from FIG. 2 to FIG. 4 and the test results of the above-mentioned flowability that, the fine powders prepared in Examples 3 to 5 has high yield, uniform particle size distribution, good flowability, good degree of sphericity, low content of hollow powder and satellite powder. Compared with Example 3, in Example 5, changing the rotation speed of the electrode and the initial flow rate of the fluid medium has an impact on the yield of fine powder. Under the process parameters of Example 3, the yield of fine powder was higher.

Each of the technical features of the above-mentioned embodiments may be combined arbitrarily. To simplify the description, not all the possible combinations of each of the technical features in the above embodiments are described. However, all of the combinations of these technical features should be considered as within the scope of this disclosure, as long as such combinations do not contradict with each other.

The above-mentioned embodiments are merely illustrative of several embodiments of the present disclosure, which are described specifically and in detail, but it cannot be understood to limit the scope of the present disclosure. It should be noted that, for those ordinary skilled in the art, several variations and improvements may be made without departing from the concept of the present disclosure, and all of which are within the protection scope of the present disclosure. Therefore, the protection scope of the present disclosure shall be defined by the appended claims

What is claimed is:

1. A method for preparing a spherical powder, comprising the following steps:
    placing an electrode and a workpiece at two electrodes of a power supply, adjusting a discharging gap between the electrode and the workpiece by a motion control system to generate an arc plasma, when the arc plasma acts on surfaces of the electrode and the workpiece, the surfaces of the electrode and the workpiece are melted to form a melting region, at the same time, introducing a fluid medium into the discharging gap, controlling a flow rate of the fluid medium and a relative rotation speed of the electrode or the workpiece, so as to change a working morphology of the arc plasma, such that an explosion is generated in the melting region, crushing and throwing away a material located in the melting region, condensing the crushed molten material in the fluid medium, and collecting a condensed fine spherical powder;
    wherein the electrode is connected to an anode of the power supply, the power supply drives the electrode to rotate;
    wherein the workpiece is connected to a cathode of the power supply;
    wherein the electrode and the workpiece are each provided with a hollow cavity, the fluid medium is introduced through the hollow cavity of the electrode and the hollow cavity of the workpiece, and a rotation axis of the electrode coincides with an extending direction of the hollow cavity of the workpiece.

2. The method for preparing the spherical powder according to claim 1, wherein a distance between a discharge end of the electrode and the workpiece is from 0.1 mm to 100 mm.

3. The method for preparing the spherical powder according to claim 1, wherein the electrode provided with the hollow cavity is an electrode provided with a single tube, multiple tubes or a hollow nesting.

4. The method for preparing the spherical powder according to claim 1, wherein the fluid medium is introduced from an outside of the hollow cavity of the workpiece.

5. The method for preparing the spherical powder according to claim 1, wherein the fluid medium is a water-based medium and/or inert gas.

6. The method for preparing the spherical powder according to claim 1, wherein the rotation speed of the electrode is from 3,000 r/min to 60,000 r/min, or the rotation speed of the workpiece is from 3,000 r/min to 60,000 r/min.

7. The method for preparing the spherical powder according to claim 1, wherein the flow rate of the fluid medium during initial introduction is from 0.5 L/min to 500 L/min.

8. The method for preparing the spherical powder according to claim 1, wherein the power supply is a direct current pulse power supply, a direct current constant current power supply, an alternating current pulse power supply or an alternating current constant current power supply.

9. The method for preparing the spherical powder according to claim 1, wherein the electrode and the workpiece are both conductor materials or weakly conductive materials, and the electrode and the workpiece are made of the same or different materials.

10. The method for preparing the spherical powder according to claim 1, wherein the condensed fine spherical powder is cleaned, dried and sieved, and a spherical powder with a particle size between 10 μm to 250 μm is collected.

11. The method for preparing the spherical powder according to claim 10, wherein the condensed fine spherical powder is collected using a multi-stage powder collecting device provided with a horn-shaped buffer portion and a step-shaped collection platform smoothly connected to the horn-shaped buffer portion, wherein each step corresponds to one collection platform.

12. The method for preparing the spherical powder according to claim 10, wherein when cleaning the condensed fine spherical powder, a used cleaning agent is an alcohol cleaning agent, an ether cleaning agent or a carbonated cleaning agent.

* * * * *